United States Patent Office 3,224,790
Patented Dec. 21, 1965

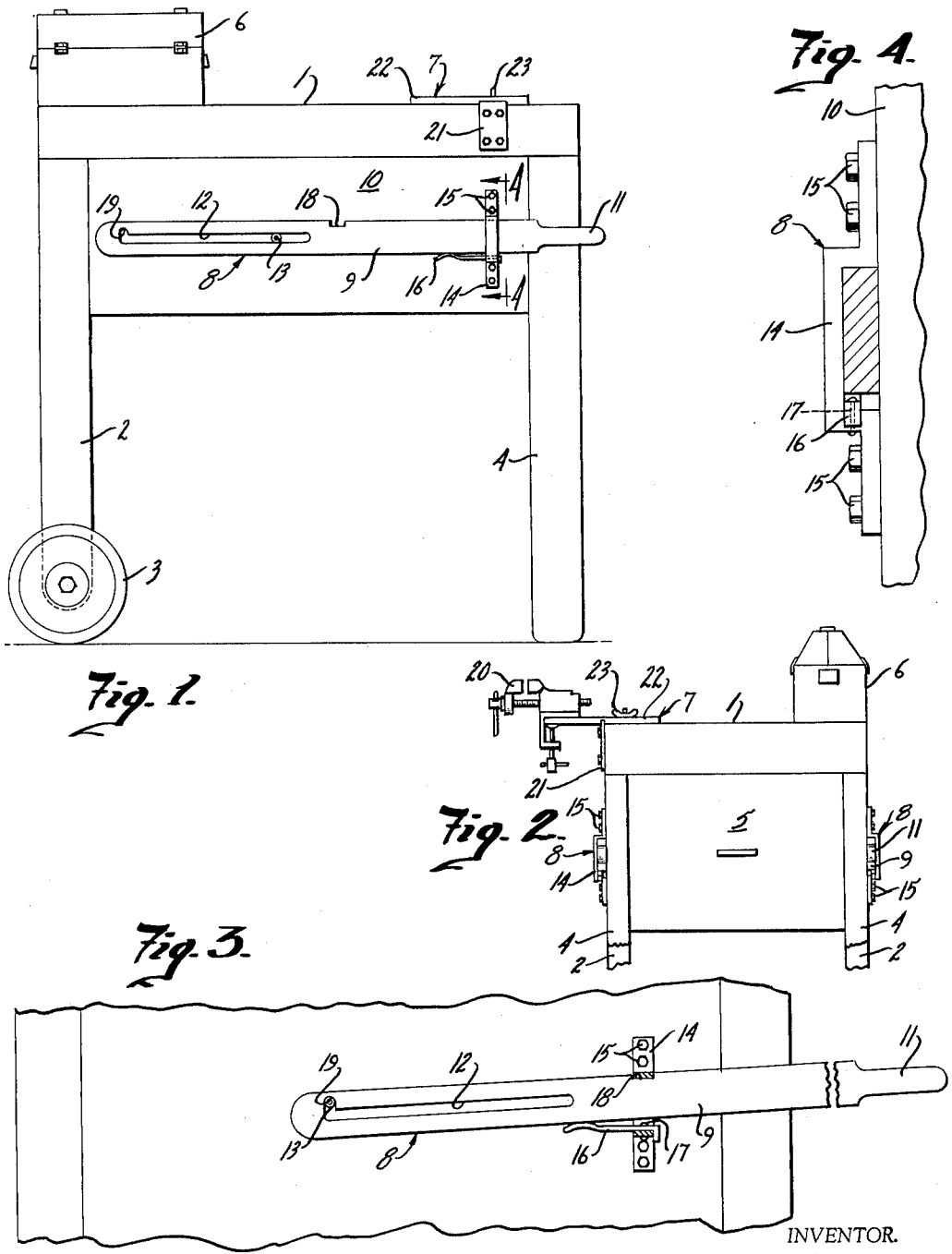

3,224,790
MOVABLE CARTS AND THE LIKE
Raymond F. Holstein, 3018 W. Grace Ave., 117N, Mequon, Wis.
Filed Feb. 17, 1964, Ser. No. 345,162
8 Claims. (Cl. 280—47.37)

This invention relates to a movable cart and the like and particularly to a movable cart having a unique sliding handle structure and which is particularly adapted for shop or yard work.

For work in garages and shops as well as outdoor yards and the like, it is often necessary to carry a plurality of tools and other equipment. Generally, wheeled carts or the like may be used to carry the tools and also provide a movable workbench area which can be moved readily from place to place.

In order to facilitate movement of the cart, it is preferably provided with projecting handles which can be grasped by the worker to move the cart by either pushing or pulling thereon. However, such handles are preferably removed or moved out of the way after reaching the working area in order to eliminate the danger inherent in protruding handles as well as to facilitate storage of the cart when not in use.

In accordance with the present invention, the cart is constructed with a pair of sliding handle members slidably mounted to opposite sides of the cart assembly. When the cart is stored or disposed in a working area, the handles are slid inwardly adjacent the side of the cart and therefore out of the way. When it is desired to move the cart, the handles are pulled outwardly and simple interlocking means positively hold the handles in the extended position. The interlocking means is further interrelated with the structure such that lifting upwardly on the handles to permit movement of the cart further insures or urges the interlocking means in the locked position to positively prevent collapse of the handles while moving of the cart.

The cart preferably is provided with forward wheeled supports while the trailing members are wheelless back legs. Such structure will not only provide firmness within the work area as a result of the trailing legs but will insure that the operator will lift upwardly on the handles to positively interconnect the locking mechanism when it is desired to move the cart from one place to another.

More particularly, the handle assembly of the present invention includes a sliding inward inner support for the handles such as a pin connected to the side of the cart and projecting outwardly through a slot in the forward portion of the handle. A bracket support is provided for the outer end of the handle structure. The handle includes a mating notch on the upper surface thereof which in the extended position is aligned with the bracket to provide a releasable latch therebetween. A spring member is provided to the bottom side of the handle to urge it upwardly such that when the handle is pulled outwardly the notch and bracket will automatically intermate to hold the handle in the extended position. Further, when the handle is pulled outwardly, the pin moves to the end of the slot which is provided with a notch adapted to mate with the pin to provide a further interlocking. Further, with the arrangement as described, when the handles are pulled outwardly the upward force on the handle will assist the interlocking action provided by the spring such that when the operator pushes forwardly, there is no danger of the handle collapsing.

The present invention thus provides a very simple and reliable handle structure which can be readily constructed with a minimum expense. Such a cart can be employed within shops for transporting of tools and the like or can be employed out in the field or yard by farmers, ranchers, grading contractors, gardeners and the like.

The drawing furnished herewith illustrates a preferred embodiment of the present invention clearly illustrating the many advantages discussed above as well as others which will be obvious to those skilled in the art.

In the drawing:

FIG. 1 is a side elevational view of a yard cart constructed in accordance with the present invention;

FIG. 2 is a front elevational view with the legs broken away;

FIG. 3 is a fragmentary view similar to a portion of FIG. 1 showing the cart assembly with the handles in an extended position; and FIG. 4 is an enlarged vertical section taken on line 4—4 of FIG. 1.

Referring to the drawings and particularly to FIGS. 1 and 2, an outdoor shop and yard cart is illustrated constructed in accordance with the present invention and including an upper platform or working area 1 supported by a pair of front or forward legs 2 which depend from the corresponding outer edges thereof. Suitable wheels 3 are secured to the lower end of the front legs to facilitate movement of the cart by raising of the cart onto the front legs. The back of the cart is provided with rear legs 4 secured to the upper end of the rear edge of the platform 1 projecting downwardly. The rear legs are rollerless and are adapted to set directly on the adjacent floor area to provide stability of the cart in the working position. Thus, if wheels are provided on all four of the legs, the cart may tend to roll as a result of slight bumping or other accidental engagement with the cart. In the illustrated embodiment of the invention, the cart is shown with a tool drawer 5 immediately below the platform 1. A tool box 6 may readily be stored on a portion of the platform 1. The present invention also provides a vise or clamp mounting unit 7 which can be readily removed or secured to the top platform 1 as desired. The slidaway handle assemblies 8 of the present invention are secured one each to opposite sides of the cart immediately below the platform 1. The handle assemblies 8 as hereinafter described may be slid inwardly to the position shown in FIG. 1 or extended outwardly to the position of FIG. 3. When extended outwardly, they may be grasped by the operator to either push or pull the cart as desired.

More particularly, the handle assemblies 8 of the present invention are similarly constructed and the assembly shown to the left side of the cart, as viewed in FIG. 2, is hereinafter described.

Generally, the handle assembly 8 includes a handle 9 of a length somewhat shorter than the total depth of the cart, as shown in FIG. 1. The handle 9 is secured adjacent the side wall 10 of the cart in the illustrated embodiment of the invention and includes a grip portion 11. As shown in FIG. 1, in the completely collapsed or inwardly extended position, the outer end of the handle preferably protrudes outwardly a very slight distance beyond the rear legs 4 to allow ready grasping of the handle for outward pulling thereof to the extended position shown in FIG. 3.

The illustrated handle 9 is shown as a slat-type member having an elongated slot 12 formed on the inner portion thereof. The slot 12 extends somewhat in excess of one-half of the length of the handle in FIG. 1. A bolt or guide rod 13 is secured to the side wall 10 of the cart and projects laterally outwardly through the slot 12 to support the inner end of the handle thereon. The outer end of the handle is supported by a U-shaped bracket 14 shown bolted or secured to the side wall 10 immediately inwardly of a rear leg 4. The U-shaped bracket 14, as shown most clearly in FIG. 4, is generally a hat-shaped section with attachment screws 15 passing through the outer flanges and into the side wall 10 to securely attach the bracket in place.

In the illustrated embodiment of the invention, the bracket 14 defines a guide channel somewhat greater in width that the depth of the handle 9 which slides therethrough. A leaf spring 16 has one end secured to a side wall of the bracket as by a rivet 17 and extends rearwardly therefrom beneath or below the underside of the bracket 14. The leaf spring extends rearwardly and upwardly into biasing engagement with the underside of the handle 9 to continuously urge the portion of handle immediately adjacent the bracket 14 upwardly into engagement with the top side wall of the bracket. The spring is made of any suitable material and may be advantageously formed of a band spring steel such as used in engine starters. The spring 16 is provided with sufficient curvature to provide a firm spring action with the outer end preferably bent downwardly to present a smooth bearing surface to the underside of the handle.

The handle 9 is provided with a pair of interlocking notches 18 and 19. The notch 18 is formed of a top edge of the handle 9 and is located inwardly from the grip portion 11 a selected distance such that with the handle pulled outwardly to the desired operating position as shown in FIG. 3, the notch 18 is aligned with the U-shaped mounting bracket 14. The leaf spring 16 which continuously urges the adjacent portion of the handle upwardly will cause the handle 9 to move upwardly when the handle is pulled outwardly to also provide a ready means for positioning of the handle.

Additionally, the notch 19 is shown as a round notch cut or otherwise formed on the upper surface of the guide slot 12 adjacnt the innermost end thereof. The length of the slot 12 is selected in relation to the extended position of the handle 9 and the mating of the notch 18 and the bracket 14 such that the inner notch 19 is aligned with the guide bolt 13 when the handle 9 is pulled out to the outermost position. As a result, the innermost end of the handle 9 will fall downwardly and move into engagement with the guide bolt. In the drawing, the pin 13 is secured to the frame or body structure. However, if desired, the pin may of course be secured to the handle 9 and an appropriate slot or guide recess be provided in the body structure. Such changes will be clear to those skilled in the art and no further description or explanation of such are discussed.

Although the leaf spring 16 will tend to cause the handle to rotate clockwise as viewed in FIG. 3 and effect disengagement between the notch and the bolt, the strength of the steel spring can be selected such that the inner end will provide a desired locking engagement. Further, as shown in FIG. 3, when the operator lifts upwardly on the handle 9, it will be positively pivoted about the bracket 14 such that the inner end of the handle is positively held downwardly with the nocth 19 resting on the guide bolt 13 to provide a tight firm interlocking whenever a forward or rearward force is applied to the handles.

In the illustrated embodiment of the invention, the vise mounting unit 7 also provides a very simple means for providing a tool mounting such as a vise 20 which is shown mounted in FIG. 2. The one edge of the platform 1 is provided with a raised or upstanding flange 21 which may be integrally formed on a platform or may be a separate member as shown. A plate 22 is releasably secured to the top of the platform 1 by a bolt and wing nut unit 23, for example, immediately adjacent the flange. The plate 22 is a rectangular member with the attachment to platform 1 spaced from the flange 21 a sufficient distance to allow placement of the rectangular plate parallel to the platform and immediately inside of the flange 21, as viewed in FIG. 1. The underside of the plate 22 includes a groove 24 generally corresponding to the width or thickness of the flange 21 and spaced to mate therewith when plate 22 is rotated ninety degrees from the position of FIG. 1 to the position of FIG. 2. Tightening of the wing nut unit 23 provides a firm positive securement of the plate 22 with the plate extending laterally of the platform 1 a sufficient distance to permit mounting of a vise 20 or other tool.

In the operation of the present invention, the handles 9 are slid inwardly, as shown in FIG. 1 during work or storage. The spring 16 holds the handles 9 upwardly adjacent the bracket 14 and provides a friction support of the handles to prevent them from accidentally moving outwardly. Thus, even if the platform is on a slightly raised area, the handles remain in place. The rear stationary legs 4 which rest directly on the floor or surrounding area provides a very firm support tending to hold the cart in the desired position.

When it is desired to move the cart, the person need only grasp the grip portion 11 of the handles 9 which preferably protrudes outwardly the slight amount as shown in FIG. 1. Upon pulling outwardly, the leaf springs 16 automatically cause the handles 9 to move upwardly when the corresponding notches 14 align with the brackets 14 with previously described interlocking of the notches 18 and brackets 14. Simultaneously, notches 19 align with the guide bolts 13 to provide a secondary interlocking pin and notch support. The operator then lifts upwardly on the outer end or grip portions of the handles 9 thereby positively pivoting them about the brackets 14 whereby the notch interlocks are further secured. The cart can then be pushed or pulled without any danger of handle collapse.

To collapse the handles 9, the operator need merely push down slightly on the outer grip portions 11 which cause the handles to move downwardly against the bias of the springs 16 and disengage the bracket 14 to allow the inward movement of the handles. The downward movement will also cause the inner end of the handle to move upwardly to disengage the inner notch 19 from the guide bolt 13.

The present invention thus provides an improved handle structure which will permit movements of relatively heavy cart structures over rough terrain where necessary without danger of handle collapse and further provides for a rapid positioning of the handle between an operative and inoperative position.

Various modes of carrying out the invention are contemplated as being within the scope of the following claims particularly pointing out and distinctly claiming the subject matter which is regarded as the invention.

I claim:
1. A slidaway handle unit including,
   a slat-type handle,
   front guide means slidably supporting the inner end of the handle and including mounting means,
   a rear guide means slidably supporting the outer end of the handle and including mounting means, and
   releasable locking means including a first portion and a second locking portion one of which is on the handle and the other of which is on the rear guide means, and resilient means urging said portions into releasable locking engagement with the handle extended outwardly to an operating position.
2. The slidaway handle unit of claim 1 wherein,
   said releasable locking means includes a recess as the first portion in one of the handles aligned with a correspondingly shaped adjacent portion of the rear guide means constituting the locking portion, and
   the resilient means is a spring secured to the rear guide and means continuously urging the handle portion adjacent the rear guide means toward said correspondingly shaped adjacent portion such that the handle moves into interlocking engagement with the rear guide means as the handle moves outwardly.

3. The slidaway handle unit of claim 2 wherein,
the front guide means includes a pin and slot support on the inner end of the handle and
said slot includes a locking recess aligned with the pin with the handle moved outwardly to the operating position.

4. A slidaway handle unit including,
a support member,
an elongated handle, having an inner longitudinal slot and a top recess generally intermediate the handle,
a front guide pin projecting from the support member in supporting engagement into the slot,
a rear guide bracket secured to the support member and slidably supporting the outer end of the handle and having a plate-like member adjacent the top edge of the handle and generally of a width corresponding to the width of the top recess in the guide bracket, and
a spring secured to the bracket and urging the handle upwardly at the guide bracket to resiliently hold the handle with the plate-like member within the recess.

5. The slidaway handle unit of claim 4 wherein,
said rear guide bracket includes a generally U-shaped portion defining upper and lower guide members and a vertical outer wall with the handle passing therethrough, and
said spring is a leaf spring secured to the lower guide member and extending beneath the handle with the outer end resiliently engaging the underside of the handle.

6. In a cart assembly body structure on supporting wheel means and at least one handle unit, said handle unit comprising,
a guide bracket secured to the forward portion of the body structure,
a handle slidably disposed within the bracket and having an upper edge notch aligned with the bracket when the handle extends outwardly of the structure in a position for moving the structure, a pin and a slot connection, means provided on the handle to slidably support the inner portion of said handle with the pin and slot interengaging in locking relation with the handle extended, and
a leaf spring secured at one end to the bracket and extending inwardly and upwardly beneath the handle with the outer end resiliently engaging the underside of the handle, said spring forcing said handle upwardly to interengage said upper edge notch with said bracket.

7. In a cart assembly having a body structure with side frames and supporting wheel means and handle units disposed one to opposite sides of the body structure, each of said handle units comprising,
a guide bracket secured to the forward portion of the side frame,
a handle slidably disposed within the bracket and having a locking recess aligned with the bracket with the handle extended outwardly of the structure in a position for moving the structure, said handle including a guide slot in the inner end with a notch formed in the upper wall of the slot,
a spring resiliently urging the handle upwardly into sliding engagement with the guide bracket, and
a guide bolt secured to the side frame of the structure and extending outwardly through the slot to support the inner end of the handle aligned with the notch in the upper wall of the slot when the upper edge recess is aligned with the guide bracket.

8. In a cart assembly having a body structure with side frames and supporting wheel means and handle units disposed one to opposite sides of the body structure, each of said handle units comprising,
a U-shaped guide bracket secured to the forward portion of the side frame,
a handle slidably disposed within the bracket and having an upper edge notch aligned with and corresponding to the adjacent portion of the bracket when the handle extends outwardly of the structure in a position for moving the structure, said handle including a slot in the inner end of the handle with a notch formed in the upper wall of the slot at its innermost end,
a leaf spring secured at one end to the bracket and extending inwardly and upwardly beneath the handle with the outer end resiliently engaging the underside of the handle, said spring forcing said handle upwardly to interengage said upper edge notch with said bracket, and
a guide bolt secured to the side frame of the structure and extending outwardly through the slot to support the inner end of the handle, said slot being selected to align the bolt and notch in the upper wall of the slot when the upper edge notch is aligned with the U-shaped guide bracket.

References Cited by the Examiner

UNITED STATES PATENTS

| | | | |
|---|---|---|---|
| 869,423 | 10/1907 | Cowan | 16—115 |
| 1,137,993 | 5/1915 | McCarthy | 280—47.37 X |
| 1,474,478 | 11/1923 | Huffman | 280—491 X |
| 1,828,248 | 10/1931 | Hallowell et al. | 280—47.37 X |
| 2,962,293 | 11/1960 | Malami | 280—47.37 X |

FOREIGN PATENTS 1,246,906  10/1960  France.

BENJAMIN HERSH, *Primary Examiner.*

KENNETH H. BETTS, *Examiner.*